United States Patent [19]
Yakos

[11] Patent Number: 6,067,503
[45] Date of Patent: May 23, 2000

[54] METHOD AND APPARATUS FOR COMPENSATING UNEXPECTED FREQUENCY SHIFTS IN POSITIONING RECEIVERS

[75] Inventor: Michael D. Yakos, Cedar Rapids, Iowa

[73] Assignee: Rockwell Collins, Inc., Cedar Rapids, Iowa

[21] Appl. No.: 09/275,569

[22] Filed: Mar. 24, 1999

[51] Int. Cl.[7] .............................. G01S 5/03; G01S 5/02
[52] U.S. Cl. .......................................... 701/213; 701/200
[58] Field of Search .................................. 701/213, 200; 342/357.12

[56] References Cited

U.S. PATENT DOCUMENTS

| | | | |
|---|---|---|---|
| 4,689,626 | 8/1987 | Hori et al. | 342/357 |
| 5,040,240 | 8/1991 | Keegan | 455/260 |
| 5,402,442 | 3/1995 | Ishigaki | 375/200 |
| 5,420,593 | 5/1995 | Niles | 342/357 |
| 5,600,328 | 2/1997 | Tachita et al. | 342/357 |
| 5,717,402 | 2/1998 | Chu | 342/357 |
| 5,717,403 | 2/1998 | Nelson et al. | 342/357 |
| 5,729,235 | 3/1998 | Guthrie et al. | 342/357 |
| 5,737,374 | 4/1998 | Jeanclaude et al. | 375/376 |
| 5,781,156 | 7/1998 | Krasner | 342/357.12 |
| 5,798,732 | 8/1998 | Eshenbach | 342/357.12 |
| 5,841,396 | 11/1998 | Krasner | 342/357.02 |
| 5,854,605 | 12/1998 | Gildea | 342/357.03 |
| 5,861,842 | 1/1999 | Hitch et al. | 342/357.15 |
| 5,874,914 | 2/1999 | Krasner | 701/213 |
| 5,883,597 | 3/1999 | DeWulf | 375/200 |
| 5,940,027 | 8/1999 | Forseth et al. | 342/357.06 |
| 5,959,575 | 9/1999 | Abbott | 342/357.06 |

*Primary Examiner*—William A. Cuchlinski, Jr.
*Assistant Examiner*—Olga Hernandez
*Attorney, Agent, or Firm*—Nathan O. Jensen; Kyle Eppele; J. P. O'Shaughnessy

[57] ABSTRACT

Unexpected frequency shifts in GPS receivers are compensated by utilizing a shock detector or temperature transient detector. The detector can be utilized with a GPS receiver and provides a signal to adjust the signal-search algorithm. The signal-search algorithm is able to acquire or reacquire a satellite signal more quickly when adjusted by the shock detector. The receiver can be utilized in guided munitions and other vehicles which are susceptible to temperature transients and mechanical shocks.

19 Claims, 3 Drawing Sheets

METHOD AND APPARATUS FOR COMPENSATING UNEXPECTED FREQUENCY SHIFTS IN POSITIONING RECEIVERS

FIELD OF THE INVENTION

The present invention relates to positioning systems. More particularly, the present invention relates to a positioning system receiver that can accommodate an unexpected externally induced frequency shift.

BACKGROUND OF THE INVENTION

Global navigational satellite systems (GNSS) include the global positioning system (GPS) and the global orbiting navigational satellite system (GLONASS). GNSS-based navigational systems are often utilized by military and civilian naval, ground, and airborne vehicles or platforms for navigation, targeting, and positioning applications.

In a GPS navigational system, GPS receiver units receive satellite or coded GPS signals from a set of twenty-four (24) Navstar satellites deployed in 12-hour orbits about the earth and dispersed in six orbital planes at an altitude of 10,900 nautical miles in half geosynchronous orbits. The position of the GPS satellites is controlled and monitored by the Department of Defense (DoD). GPS satellites continuously emit coded GPS signals.

The GPS signal contains timing information that allows a user to determine the time elapsed for the GPS signal to traverse the distance between the GPS satellite and the user (the platform). By knowing the time the GPS signal left the GPS satellite, the time the GPS signal arrived at the user, and the speed of the GPS signal, the user can determine the distance from itself to the GPS satellite. By knowing the position of the GPS satellite (ephemeris data), and the distance from itself to the GPS satellite, the user can successfully triangulate its own position.

The GPS signal emitted by the satellites contains L-band carrier components at the transmitted frequencies of 1.575 GHz (L1) and 1.2276 GHz(L2). The L1 carrier component is phase shift keyed (PSK) modulated by two orthogonal pseudo-random noise (PRN) codes, a precise P(Y) code at a chipping rate of 10.23 MHz and a course acquisition (C/A) PRN code at a chipping rate of 1.023 MHz. Navigation data at 50 bits per second is modulo-2 added to each ranging code. The PRN ranging codes provide timing information for determining when the GPS signal was broadcast. The data component provides information, such as, the satellite orbital position. The L2 carrier is similar to the L1 carrier except that it contains either one but not both simultaneously PSK modulated P(Y) and C/A codes.

Position determination using a conventional GPS receiver is well known in the art. In conventional GPS, a receiver makes ranging measurements between an antenna coupled to the receiver and each of at least four GPS satellites in view. The receiver makes these measurements from the timing information and the satellite orbital position information obtained from the PRN code and data components of each GPS signal received. By receiving four different GPS signals, the receiver can make accurate position determinations.

The receiver acquires the satellite signals after down conversion by a direct injection local oscillator (LO). The LO is referenced and locked to a high quality crystal oscillator. The downconverted signal is quantized and digitally processed to determine PRN code position and the data component, hence, to calculate position information.

In prior art positioning system receivers, such as, a GPS receiver, a mechanical shock or sudden temperature transient can adversely affect the positioning determinations of the receivers. Generally, the mechanical shock or temperature transient can cause the GPS receiver to lose track of the satellite signals or can prevent the GPS receiver from acquiring the satellite signals.

More particularly, an external event, such as, a mechanical shock or a temperature transient, can degrade the accurate operation of the reference oscillator. The external event shifts the frequency of the signal generated by the reference oscillator, which causes the receiver to lose lock on the satellite signal if the receiver is tracking the satellite signal. If the receiver is not tracking the satellite signal, the frequency shift extends the amount of time required to acquire the satellite signal. The frequency shift results in these problems because the digital signal processing algorithms expect only nominal frequency shifts due to host vehicle or satellite motion.

External events, such as, sudden temperature transients and mechanical shocks, can occur in various stationary and mobile applications of GPS receivers. The delay in satellite acquisition time is particularly disadvantageous in GPS receivers utilized in gun-fired munitions or projectiles (e.g., GPS-guided ordinance). Generally, munitions can undergo an acceleration (e.g., a mechanical shock) of 8,000–30,000 G (One G=32.2 ft/sec$^2$) of launch shock when fired. Any delay in initially acquiring the satellite can seriously adversely affect the ability of the receiver to provide positioning information because munitions traveling times are often very short. Reference oscillator frequency shifts of greater than +/−2 parts per million (ppm) can result from launch shocks.

In conventional systems, a sudden frequency shift due to an external event is indistinguishable from a Doppler shift caused by movement of the satellites or the GPS receiver. In response to a Doppler shift, the GPS receiver adjusts its local oscillator to center on the Doppler offset. It then scans (searches) the PRN ranging code in a window centered about the Doppler offset frequency to acquire or re-acquire the signal. The search is normally divided into several windows; each window representing approximately +/−0.24 ppm of the reference oscillator frequency shift. The receiver must scan all code positions in each window until the signal is acquired. The amount of time required to reacquire the signal can be great if a large number of windows must be searched.

In other applications, such as, aircraft, missiles, or ground or naval vehicles, temperature shifts and mechanical shocks can occur during normal operation. As stated above, in applications, such as, artillery launched GPS-guided projectiles, reference oscillator frequency shifts greater than +/−2 ppm can result from the 8,000–30,000 G launch shock. Further, tactical GPS-guided missiles can experience several hundred to several thousand G launch shocks, as well as major pyrotechnical shocks. A large frequency shift (e.g., +/−2 ppm) can require over eight frequency (Doppler) windows to be searched by the receiver post launch, thus extending satellite acquisition times.

Thus, there is a need for a positioning receiver that is less susceptible to losing signal lock due to mechanical shock or temperature transients. There is also a need for a positioning receiver that has a reduced delay due to the mechanical shock or temperature transients when initially acquiring the satellite signal. Further still, there is a need for a GPS receiver that can compensate for frequency changes due to mechanical shock.

SUMMARY OF THE INVENTION

The present invention relates to a receiver including a first oscillator, a second oscillator locked to the first oscillator, a frequency shift detector coupled to the first oscillator and the second oscillator, and a data processor coupled to the frequency shift detector. The frequency shift detector provides a transient detection signal. The data processor receives the transient detection signal and offsets the acquisition frequency into a window that is more likely to acquire the satellite signal.

The present invention still further relates to a positioning system receiver having reduced signal acquisition time after a large acceleration. The positioning system receiver includes a reference oscillator, and a phase-locked loop including a voltage-controlled oscillator, a positioning system signal processor receiving an intermediate frequency signal, a frequency shift detector coupled to the reference oscillator, and a positioning system data processor coupled to the frequency shift detector and to the positioning system signal processor. The positioning system data processor receives the transient detector signal and provides a control signal to the positioning system signal processor. The frequency shift detector provides the transient detection signal. The control signal is provided to the signal-search algorithm in response to the transient detection signal.

The present invention still further relates to a positioning system receiver for determining a location in response to a plurality of satellite signals. The positioning system receiver includes a plurality of oscillators, signal processor means for receiving a form of at least one of the satellite signals and decoding the at least one satellite signal, means for detecting shift between signals from the oscillators, and data processor means for controlling the signal processor means in accordance with the shift.

BRIEF DESCRIPTION OF THE DRAWINGS

Exemplary embodiments of the present invention will be described with reference to the accompanying drawings, wherein like numerals denote like elements.

DETAILED DESCRIPTION OF THE PREFERRED EMBODIMENTS

Figure 1:
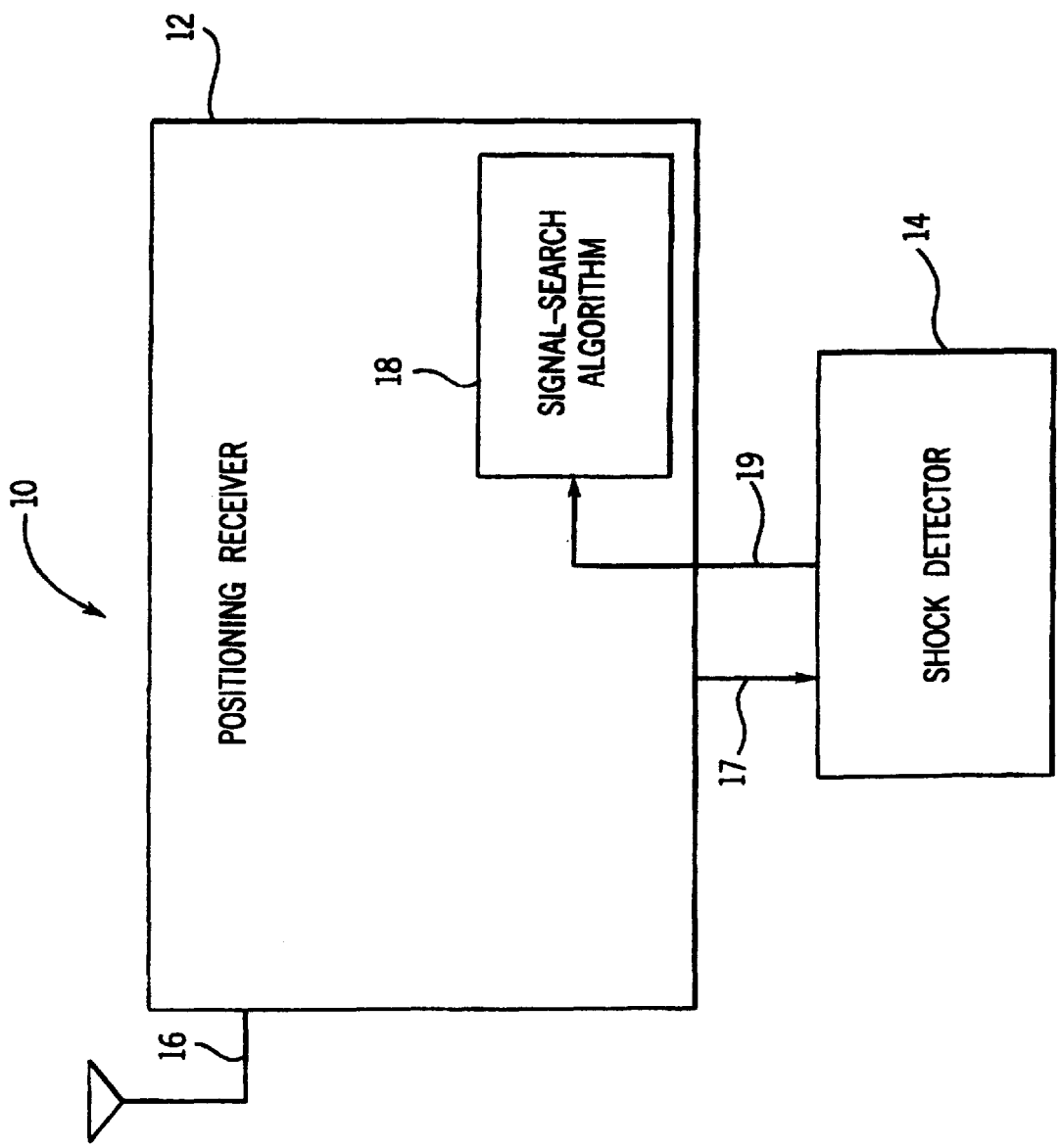
FIG. 1 is a general block diagram of a positioning receiver equipped with a shock detector in accordance with an exemplary embodiment of the present invention.

With reference to FIG. 1, a positioning receiver system 10 includes a positioning receiver 12, a shock detector 14, and an antenna 16. Positioning receiver 12 includes a circuit or processor which performs a signal-search algorithm 18. Positioning receiver 12 is preferably a GLONASS or GPS positioning receiver that can be utilized in a number of applications. Alternatively, system 10 can be utilized with psuedolite system or any positioning system which utilizes electromagnetic signals.

Receiver 12 can be mounted on any type of airborne, naval, or ground-based vehicle. More particularly, receiver 12 can be attached to gun-fired munitions or tactical-guided missiles for providing positioning information. Receiver 12 is optimized for use in applications or environments where temperature transients and mechanical shock are present.

Positioning receiver 12 receives satellite signals on antenna 16 and generates position data representative of the position of receiver 12 in response to the satellite signals. Signal-search algorithm 18 preferably is utilized to search the code (phase) associated with the satellite signals and Doppler frequency uncertainties to adjust the reception circuits of receiver 12 to acquire or reacquire satellite signals. The satellite signals generally have a frequency in the L1 band, e.g., 1.575 Gigahertz (GHz) or L2 band 1.2276 (GHz). Signal-search algorithm 18 preferably performs a Doppler search, which is divided into several windows, with each window representing approximately +/−0.24 parts per million (ppm) of reference oscillator frequency. Algorithm 18 scans all code positions in each Doppler window until the satellite signals are acquired by positioning receiver 12.

Receiver 12 can include a scorpion GPS device manufactured by Conexant Systems, Inc. in combination with a Mono-Pac RF front end and analog/digital converter device, such as, the Gemini/Pisces device manufactured by Conexant Systems, Inc. Alternatively, other types of positioning receivers 12 manufactured by a variety of GPS receiver suppliers can be utilized.

System 10 advantageously includes shock detector 14, which is configured to detect mechanical shocks or sudden temperature transients. The mechanical shocks or sudden temperature transients can cause a reference oscillator frequency shift, which causes receiver 12 to lose track of one or more satellite signals. Shock detector 14 can be any type of sensor or circuit for determining the presence of a mechanical shock or temperature transient. Preferably, shock detector 14 senses a shock or temperature transient in response to signals received at an input 17.

When shock detector 14 determines that a mechanical shock or temperature transient has occurred, shock detector 14 provides a control signal at output 19 to signal-search algorithm 18. The control signal compensates or adjusts signal-search algorithm 18 so signal-search algorithm 18 can acquire or reacquire the signal more quickly. Preferably, the control signal from detector 14 causes algorithm 18 to begin searching at a frequency window closer to the appropriate frequency window after the mechanical shock or temperature transient.

Figure 3:
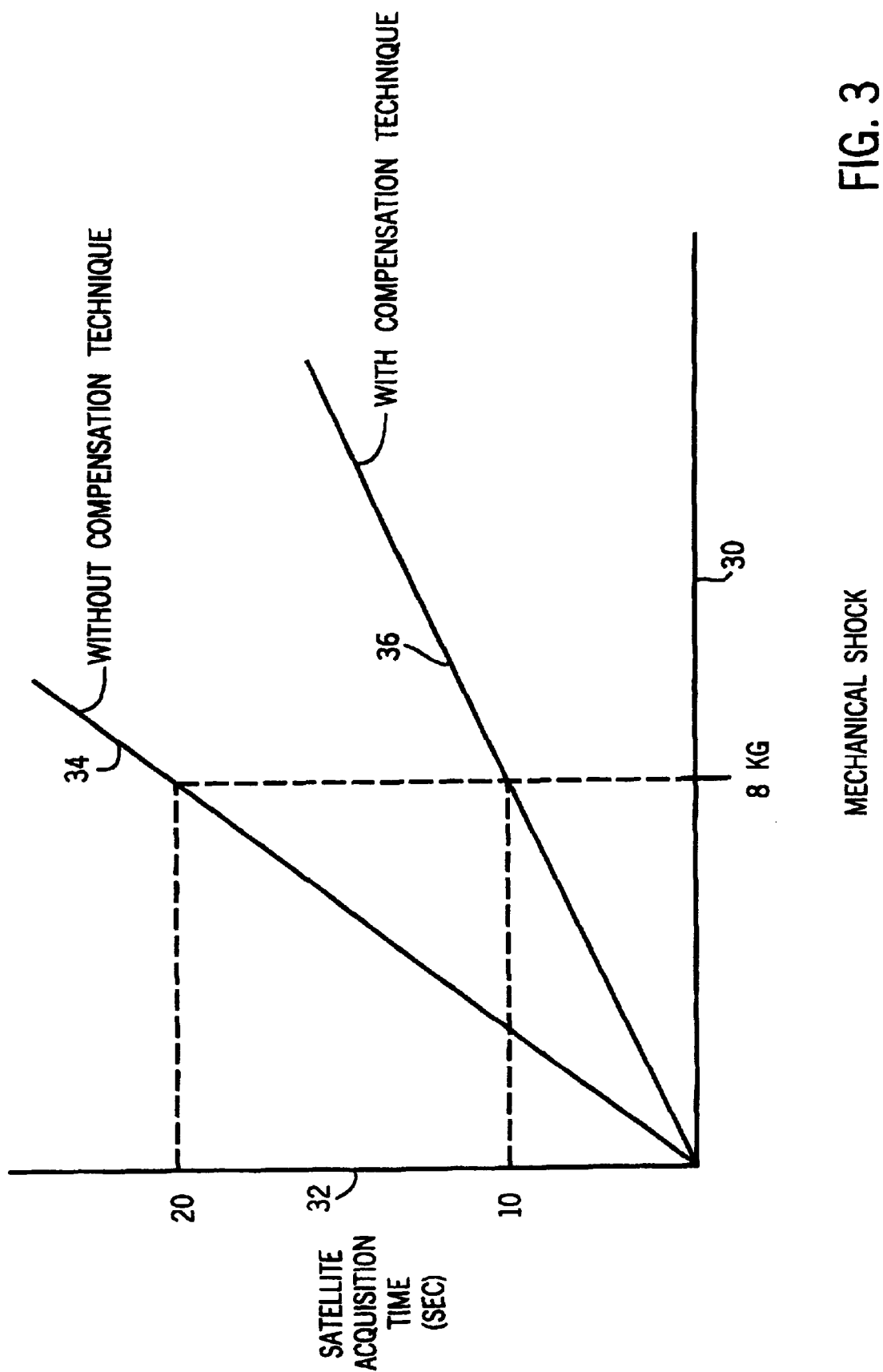
FIG. 3 is a graphical drawing showing signal acquisition times versus mechanical shock with and without the compensation technique of the exemplary embodiments of the present invention.

With reference to FIG. 3, an x-axis 30 represents force (mechanical shock) and a y-axis 32 represents satellite acquisition time. Receiver 12 (FIG. 1) in system 10 can be subject to mechanical shocks, such as, pyrotechnic shocks (several hundred to one thousands G's) associated with tactical GPS-guided missiles or launch shocks (8,000–30,000Gs) associated with gun-fired GPS-guided ammunitions.

Signal acquisition in a prior art receiver is represented by line 34 (FIG. 3). Line 34 indicates that response to an 8 KG shock will require a 20 second acquisition time for conventional GPS receivers. A line 36 indicates that system 10, equipped with shock detector 14, would require a 10-second satellite acquisition time, if system 10 receives a mechanical shock of 8 KG. Therefore, system 10 provides acquisition times of less than half of conventional acquisition times during a mechanical shock or temperature variant condition. The lower slope of line 36 with respect to line 34 indicates the superior performance in mechanical shock or transient environments of receiver 12 over conventional receivers with respect to signal acquisition times.

Figure 2:
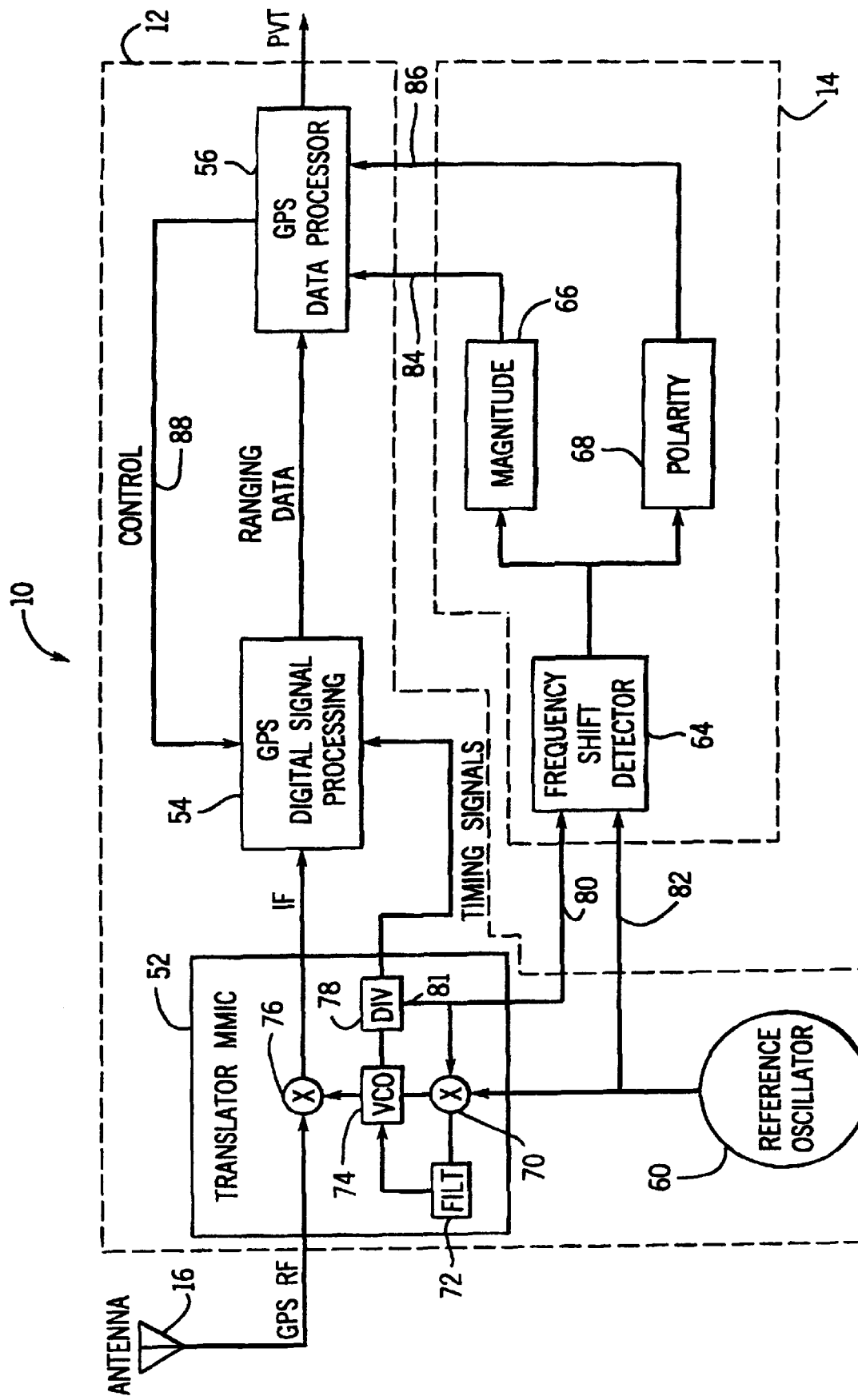
FIG. 2 is a a more detailed block diagram of a GPS positioning receiver in accordance with another exemplary embodiment of the present invention.

With reference to FIG. 2, an exemplary embodiment of system 10 is provided that advantageously requires minimal reconfiguration of a conventional GPS receiver. In system 10, receiver 12 includes a translator 52, a GPS digital signal processor circuit 54, a GPS data processor 56, and a reference oscillator 60. Shock detector 14 includes a frequency shift detector 64, a magnitude determination circuit 66, and a polarity determination circuit 68. Shock detector 14 also includes an input 80, an input 82, an output 84, and an output 86.

Translator circuit 52 includes a mixer 70, a filter 72, a voltage-controlled oscillator (VCO) 74, a divider 78, and a mixer 76. Translator circuit 52 can include a number of circuits or stages, such as, mixer 70, filter 72, VCO 74, divider 78, and mixer 76, for a more gradual frequency conversion operation. Translator circuit 52 can generally be any device for converting a satellite signal at antenna 16 to an intermediate (IF) frequency signal for GPS digital signal processor circuit 54. Preferably, translator circuit 52 is a Gemini/Pisces Mono-Pak device which may include certain external components, depending upon application parameters.

GPS digital signal processor circuit 54 and GPS data processor 56 can be a Scorpio device including an embedded AAMP 2-8 processor. Alternatively, any type of receiver 12 can utilized with the modification of the present invention without departing from the scope of the claims. The present invention is not limited to use with Conexant-type receivers.

Input 82 of shock detector 14 is coupled to reference oscillator 60. Reference oscillator 60 is preferably a mechanically-mounted crystal oscillator. Oscillator 60 is relatively susceptible to mechanical shocks and also may exhibit temperature-induced micro-jumps. The frequency of the signal generated by oscillator 60 can be shifted in either the positive or negative direction in response to a mechanical shock or a temperature transient. Preferably, reference oscillator 60 can provide a signal at approximately 10 megahertz (MHz), although any frequency signal can be utilized as a reference signal. Oscillator 60 generally has low-phase noise and high stability for tracking GPS signals received at antenna 16.

Mixer 70, filter 72, voltage-controlled oscillator (VCO) 74, and divider 78 form a loop that locks the frequency or phase of the signal from reference oscillator 60 to the frequency or phase of the signal which VCO 74 provides to mixer 76. Input 80 is coupled to an output 84 of divider 78. Divider 78 provides a frequency signal at output 84 to input 81 of detector 14.

The frequency signal from divider 78 is a divided signal of the frequency signal (e.g., the injection signal to mixer 76) generally by VCO 74. VCO 74 is preferably a solid-state, L-band oscillator that is used in the frequency synthesizer associated with translator 52. VCO 74 is locked to reference oscillator 60 and provides the local oscillator injection signal that converts the incoming GPS signal to an intermediate frequency (IF). VCO 74 uses a solid-state resonator that is less sensitive to mechanical shocks or temperature transients. When a shock occurs to system 10, oscillator 60 experiences a frequency shift, and the frequency or phase-lock loop, including VCO 74, will momentarily lose lock.

The loss of lock in the loop causes a transient that can be detected by frequency detector 64. The magnitude and polarity of the frequency shift transient are input to GPS data processor 56 to preposition signal-search algorithm 18 (FIG. 1) to the most likely frequency off-set. Rather than having to sequentially search the entire frequency uncertainty, only a small portion is sequentially searched, thereby resulting in significantly reduced satellite signal acquisition and reacquisition times.

Frequency shift detector 64 in shock detector 14 compares the signals at input 80 and 82 and provides an indication of the difference to magnitude circuit 66 and polarity circuit 68. Magnitude circuit 66 provides an indication of the magnitude of the difference between the signals at output 84. Magnitude circuit 66 can be a frequency comparator that provides an analog output related to the difference in frequency between the first reference oscillator and the second voltage controlled injection oscillator.

Polarity circuit 68 provides an indication of the polarity (plus or minus) of the difference at output 86. Polarity circuit 68 can be a comparator that determines the polarity of the analog voltage from the frequency comparator. The signals from the frequency comparator and the polarity comparator can be digitized.

GPS data processor 56 utilizes the magnitude data from circuit 66 and the polarity data from circuit 68 to adjust the signal-search algorithm (e.g., algorithm 18 (FIG. 2). Preferably, GPS data processor 56 provides a control signal via a line 88 to GPS digital signal processor 54 to adjust signal-search algorithm 18 to a frequency range associated with the difference in frequency between the signals at inputs 80 and 82. The difference in frequency is indicative of the shock detected by detector 14.

The present invention advantageously utilizes two oscillators (reference oscillator 60 and VCO 74) that are already present in conventional designs of system 10 to additionally detect mechanical shocks or temperature variations. Alternatively, additional oscillators can be utilized for making a determination of mechanical shocks or temperature transients. Further still, although oscillators 60 and 74 are shown and discussed, other oscillators within conventional design of receiver 12 can be utilized to determine mechanical shocks. Further still, other shock-sensing techniques or sensors (e.g., mechanical sensors) can be utilized.

It is understood that, while preferred embodiments, examples, and values are given, they are for the purpose of illustration only. The apparatus and method of the invention are not limited to the precise details and conditions disclosed. For example, although a shock detector based upon a frequency shift comparison is described, other shock detectors and frequency shift detection circuits could be utilized. Further, although conventional receiver architectures are discussed, the present invention can be utilized in other types of receivers. Thus, changes may be made to the details disclosed without departing from the spirit of the invention, which is defined by the following claims.

What is claimed is:

1. A receiver, comprising:
   a first oscillator;
   a second oscillator locked to the first oscillator;
   a frequency shift detector coupled to the first oscillator and the second oscillator, the frequency shift detector providing a transient detect signal; and
   a data processor coupled to the frequency shift detector, the data processor receiving the transient detect signal and selecting a frequency offset for signal acquisition in response to the transient detect signal.

2. The receiver of claim 1, wherein the first oscillator is more sensitive of mechanical shocks than the second oscillator.

3. The receiver of claim 1, wherein the transient detect signal includes a magnitude component and a polarity component.

4. The receiver of claim 1, wherein the data processor searches a range of frequencies related to the most likely frequency offset.

5. The receiver of claim 4, wherein the data processor employs a pre-position algorithm to search the range.

6. The receiver of claim 5, wherein the pre-position search algorithm begins at the frequency offset to achieve signal acquisition.

7. A positioning system receiver having reduced signal acquisition time after a large acceleration, the positioning system receiver comprising:

a reference oscillator;

a phase or frequency locked loop including a voltage-controlled oscillator;

a positioning system signal processor receiving an intermediate frequency signal;

a frequency shift detector coupled to the reference oscillator and the voltage-controlled oscillator, the frequency shift detector providing a transient detect signal; and a positioning system data processor coupled to the frequency shift detector and to the positioning system signal processor, the positioning system data processor receiving the transient detect signal and providing a control signal to the positioning system signal processor, the control signal is provided in accordance with a signal-search algorithm in response to the transient detect signal.

8. The positioning system receiver of claim 7, wherein the transient detect signal includes a magnitude component and a polarity component.

9. The positioning system receiver of claim 7, wherein the signal search algorithm searches a range of frequencies related to a most likely frequency offset determined from the transient detect signal.

10. The positioning system receiver of claim 7, wherein the reference oscillator is a crystal resonator.

11. The positioning system receiver of claim 7, further comprising:

a mixer coupled to the voltage-controlled oscillator;

an antenna for receiving a satellite signal, the antenna being coupled to the mixer, the mixer providing the intermediate frequency signal.

12. The positioning system receiver of claim 11, wherein the positioning system data processor and positioning system signal processor are GPS processors.

13. The positioning system receiver of claim 10, wherein the voltage-controlled oscillator is a solid state resonator.

14. The positioning system receiver of claim 13, wherein the crystal oscillator is mechanically mounted.

15. A positioning system receiver for determining a location in response to a plurality of satellite signals, the positioning system receiver comprising:

a plurality of oscillators;

signal processor means for receiving a form of at least one of the satellite signals and decoding the at least one satellite signal;

means for detecting shift between signals from the oscillators; and data processor means for controlling the signal processor means in accordance with the shift.

16. The positioning system receiver of claim 15, wherein the shift is due to temperature variations or mechanical shock.

17. The positioning system receiver of claim 15, wherein the receiver is utilized in a projectile.

18. The positioning system receiver of claim 15, wherein the shift is greater than a shift due to normal user or satellite motion induced doppler shifts a mixer coupled to the voltage controlled oscillator;

an antenna for receiving a satellite signal, the antenna being coupled to the mixer, the mixer providing the intermediate frequency signal.

19. The positioning system receiver of claim 16, wherein one of the oscillators is a reference crystal resonator, and the other oscillator is a solid-state resonator.

* * * * *